(12) United States Patent
Nogawa

(10) Patent No.: US 10,028,108 B2
(45) Date of Patent: Jul. 17, 2018

(54) COMMUNICATION DEVICE AND SETTING DEVICE FOR COMMUNICATING A PLURALITY OF SETTING VALUES RELATED TO A PLURALITY OF SETTING ITEMS

(71) Applicant: BROTHER KOGYO KABUSHIKI KAISHA, Nagoya, Aichi (JP)

(72) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 161 days.

(21) Appl. No.: 15/079,638

(22) Filed: Mar. 24, 2016

(65) Prior Publication Data

US 2016/0295567 A1 Oct. 6, 2016

(30) Foreign Application Priority Data

Mar. 31, 2015 (JP) ................. 2015-071552

(51) Int. Cl.
*H04W 4/06* (2009.01)
*H04W 8/00* (2009.01)

(52) U.S. Cl.
CPC ............. *H04W 4/06* (2013.01); *H04W 8/005* (2013.01)

(58) Field of Classification Search
CPC ................................ H04W 4/06; H04W 8/005
See application file for complete search history.

(56) References Cited

U.S. PATENT DOCUMENTS

| 2010/0122181 A1* | 5/2010 | Kawai ................ H04N 1/00204 715/744 |
| 2010/0208300 A1 | 8/2010 | Kamasuka |
| 2014/0028435 A1* | 1/2014 | Brockway, III .... H04N 1/00315 340/3.1 |

FOREIGN PATENT DOCUMENTS

| JP | 2010-191685 A | 9/2010 |
| JP | 2012-164134 A | 8/2012 |

* cited by examiner

*Primary Examiner* — Jackie Zuniga Abad
(74) *Attorney, Agent, or Firm* — Scully, Scott, Murphy & Presser, PC

(57) ABSTRACT

A non-transitory computer-readable storage medium may store computer-readable instructions for a communication device, wherein the computer-readable instructions, when executed by a processor of the communication device, cause the communication device to perform: accepting a setting operation performed; establishing a communication session with a first device without accepting a further operation; sending the plurality of setting values to the first device by using the communication session with the first device; disconnecting the communication session with the first device after the plurality of setting values has been sent to the first device; establishing a communication session with a second device without accepting a further operation; sending the plurality of setting values to the second device by using the communication session with the second device; and disconnecting the communication session with the second device after the plurality of the setting values has been sent to the second device.

14 Claims, 9 Drawing Sheets (First Embodiment)

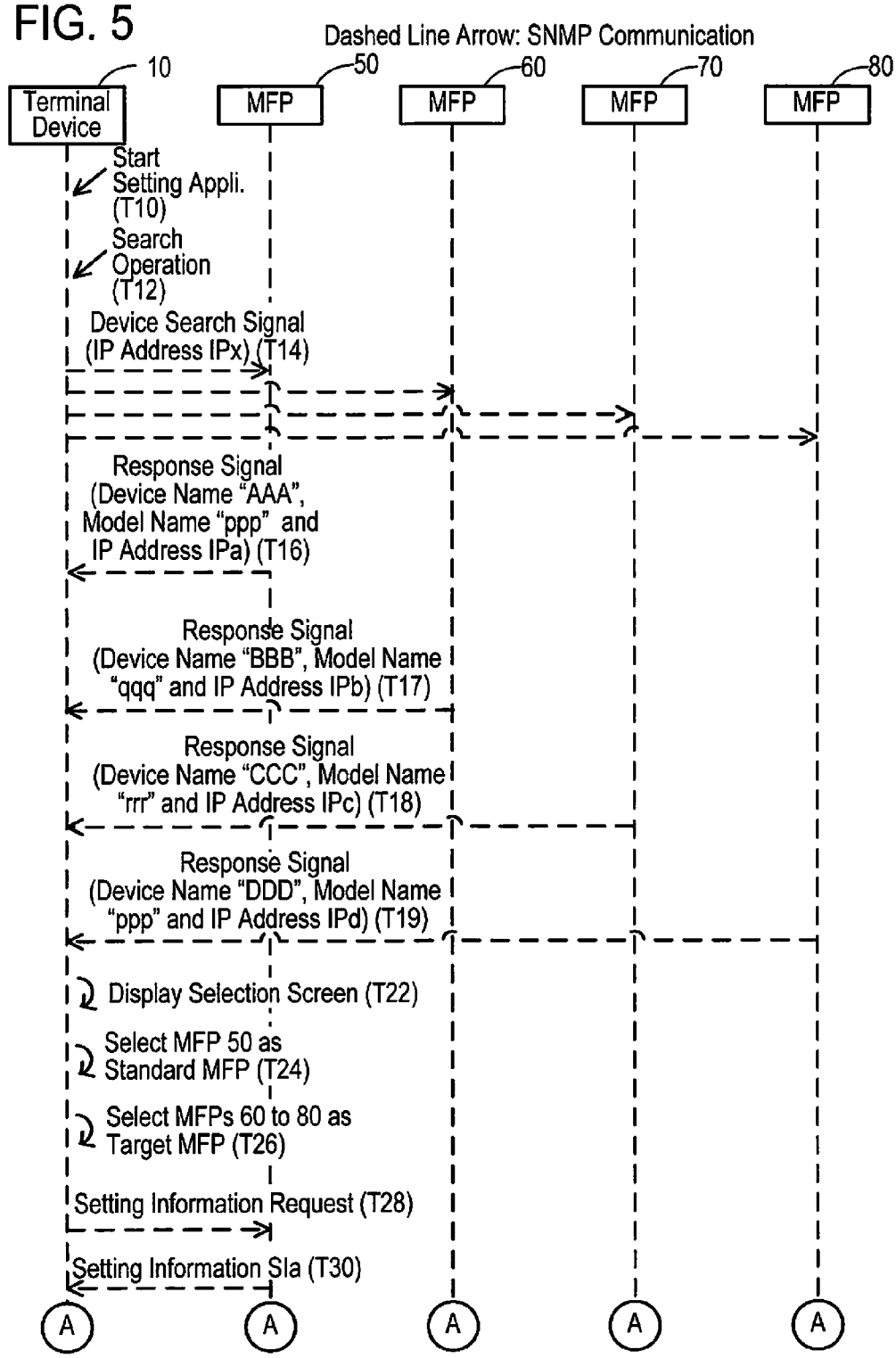

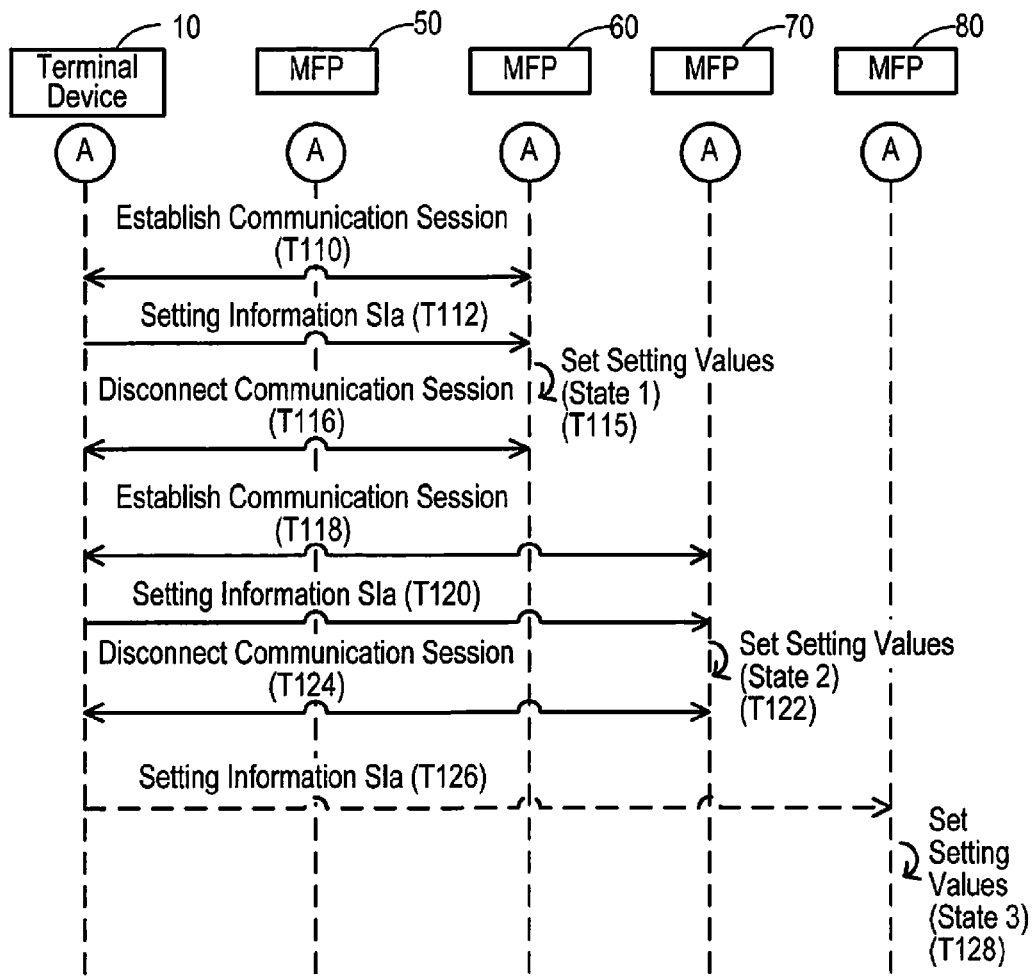

FIG. 7

(State 1)

Setting Information SIb

| Address Information | 50 of Setting Values | —62 |
|---|---|---|
| IDs 101 to 150 | (Fax Number) | |

Scan Information — 64

| Setting Items | ID | Setting Values |
|---|---|---|
| Scan Resolution | 301 | 200dpi |
| File Format | 302 | PDF |
| Color Scan | 303 | ON |

Print Information

| Setting Items | ID | Setting Values |
|---|---|---|
| Print Resolution | 401 | 200dpi |
| Color Print | 402 | ON |
| Duplex Print | 403 | ON |

—66  —68

Current Date-and-Time Information
ID 501
Setting Value (2015.03.01)

(State 2)

Setting Information SIc

| Address Information | 100 of Setting Values | —72 |
|---|---|---|
| IDs 101 to 200 | (Fax Number) | |

Scan Information — 74

| Setting Items | ID | Setting Values |
|---|---|---|
| Scan Resolution | 301 | 200dpi |
| File Format | 302 | JPEG |
| Color Scan | 303 | ON |
| Duplex Scan | 304 | ON |

Print Information

| Setting Items | ID | Setting Values |
|---|---|---|
| Print Resolution | 401 | 200dpi |
| Color Print | 402 | ON |
| Duplex Print | 403 | ON |

—76  —78

Current Date-and-Time Information
ID 501
Setting Value (2015.03.01)

(State 3)

Setting Information SId

| Address Information | 100 of Setting Values | —82 |
|---|---|---|
| IDs 101 to 200 | (Fax Number) | |

Scan Information — 84

| Setting Items | ID | Setting Values |
|---|---|---|
| Scan Resolution | 301 | 200dpi |
| File Format | 302 | PDF |
| Color Scan | 303 | ON |
| Duplex Scan | 304 | ON |

Print Information

| Setting Items | ID | Setting Values |
|---|---|---|
| Print Resolution | 401 | 200dpi |
| Color Print | 402 | ON |
| Duplex Print | 403 | ON |

—86  —88

Current Date-and-Time Information
ID 501
Setting Value (2015.03.01)

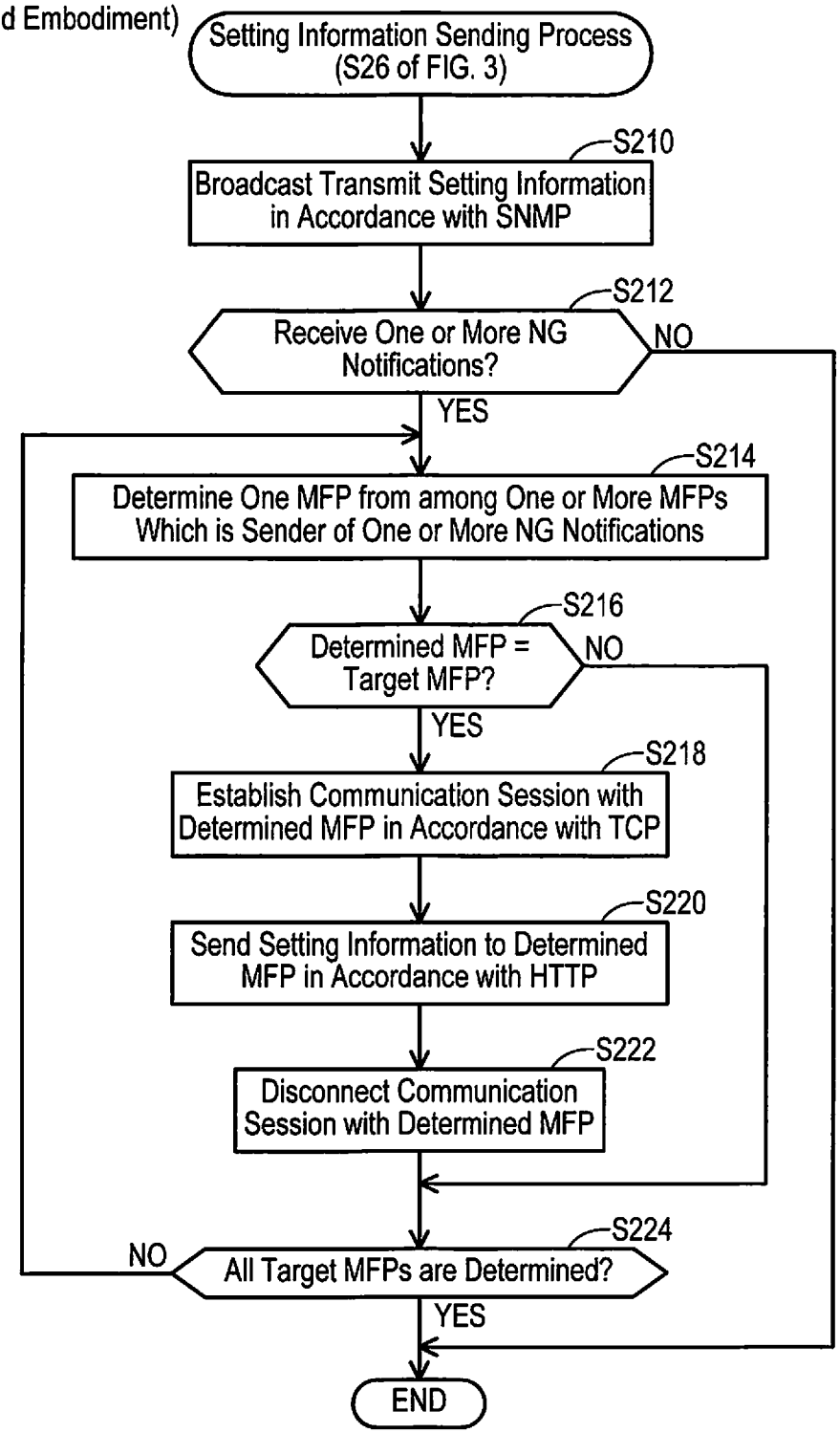

COMMUNICATION DEVICE AND SETTING DEVICE FOR COMMUNICATING A PLURALITY OF SETTING VALUES RELATED TO A PLURALITY OF SETTING ITEMS

This application claims priority to Japanese Patent Application No. 2015-071552, filed on Mar. 31, 2015, the entire contents of which are hereby incorporated by reference into the present application.

TECHNICAL FIELD

The present specification discloses a communication device that sends a plurality of setting values related to a plurality of setting items to a different device.

DESCRIPTION OF RELATED ART

A management device that manages values of MIB (abbreviation of Management Information Base) in a multi-function device by using a SNMP (abbreviation of Simple Network Management Protocol) is known. The management device executes communication in accordance with SNMP to send a plurality of object identifiers for identifying a plurality of MIBs and a plurality of new values to the multi-function device. Thereby, it is possible to change the plurality of MIB values in the multi-function device to the plurality of new values.

SUMMARY

In the above technique, even when the management device requests the multi-function device to change a plurality of values by using SNMP, there is a possibility that the multi-function device is unable to change the plurality of values appropriately. For example, in a situation in which at least one of the plurality of object identifiers is not present in the multi-function device, any one of the plurality of values, not only the value corresponding to the at least one object identifier, is not changed. Moreover, for example, in a situation in which at least one of the plurality of new values is a value that cannot be set to the multi-function device, any one of the plurality of values, not only the at least one value, is not changed. This is because it is not defined in SNMP to change only other values excluding a part of the values that cannot be set among the plurality of values. The present specification discloses a technique that a communication device appropriately sets a setting value to other devices.

One aspect disclosed in the present specification may be a non-transitory computer-readable storage medium storing computer-readable instructions for a communication device, wherein the computer-readable instructions, when executed by a processor of the communication device, cause the communication device to perform: accepting a setting operation performed by a user for setting a plurality of setting values related to a plurality of setting items in M pieces of devices different from the communication device, the M being an integer equal to two or more; establishing a communication session with a first device included in the M pieces of devices without accepting a further operation from the user after the setting operation has been accepted; sending the plurality of setting values to the first device by using the communication session with the first device in accordance with a first communication protocol in conformity to HTTP (an abbreviation of Hypertext Transfer Protocol); disconnecting the communication session with the first device after the plurality of setting values has been sent to the first device; establishing a communication session with a second device included in the M pieces of devices without accepting a further operation from the user after the setting operation has been accepted; sending the plurality of setting values to the second device by using the communication session with the second device in accordance with the first communication protocol; and disconnecting the communication session with the second device after the plurality of setting values has been sent to the second device.

Another aspect disclosed in the present specification may be a non-transitory computer-readable storage medium storing computer-readable instructions for a communication device, wherein the computer-readable instructions, when executed by a processor of the communication device, cause the communication device to perform: obtaining a plurality of setting values related to a plurality of setting items from a memory of a particular device in which the plurality of setting values is currently set; accepting a setting operation performed by a user for setting the plurality of setting values in a target device different from the communication device; establishing a communication session with the target device in a case where the setting operation is accepted and the target device has a model name which is not identical to a model name of the particular device; sending the obtained plurality of setting values to the target device by using the communication session with the target device in accordance with a first communication protocol in conformity to HTTP (an abbreviation of Hypertext Transfer Protocol); disconnecting the communication session with the target device after the plurality of setting values has been sent to the target device; and sending the obtained plurality of setting values to the target device in accordance with a second communication protocol in conformity to SNMP (an abbreviation of Simple Network Management Protocol) without establishing the communication session, in a case where the setting operation is accepted and the target device has the model name which is identical to the model name of the particular device.

Another aspect disclosed in the present specification may be a setting device comprising: a processor; and a memory configured to store a plurality of first setting values related to a plurality of setting items, wherein the memory is further configured to store computer-readable instructions therein, the computer-readable instructions, when executed by the processor, causing the setting device to perform: establishing a communication session with a communication device; receiving a plurality of second setting values related to the plurality of setting items from the communication device by using the communication session in accordance with a first communication protocol in conformity to HTTP (an abbreviation of Hypertext Transfer Protocol); in response to receiving the plurality of the second setting values, setting a part of the plurality of the second setting values related to a part of the plurality of setting items in place of a part of the plurality of the first setting values within the memory, wherein in response to receiving the plurality of the second setting values, the other part of the plurality of the second setting values related to the other part of the plurality of setting items is not set in place of the other part of the plurality of the first setting values within the memory.

A control method for realizing the communication device, is novel and useful. Moreover, a communication system comprising the communication device and at least one device (e.g. the first device, the second external device and the target device) is also novel and useful. Moreover, a control method, a computer program including computer-readable instructions, and a non-transitory computer-readable storage medium that stores the computer-readable instructions, all for realizing the setting device, are also novel and useful.

BRIEF DESCRIPTION OF DRAWINGS

FIG. 5 illustrates a sequence diagram of a specific case of the first embodiment;

FIG. 6 illustrates a sequence diagram continued from FIG. 5;

FIG. 7 illustrates states in which setting values are set to each multi-function peripheral;

FIG. 8 illustrates a flowchart of a setting information sending process of a second embodiment.

EMBODIMENTS

Figure 1:
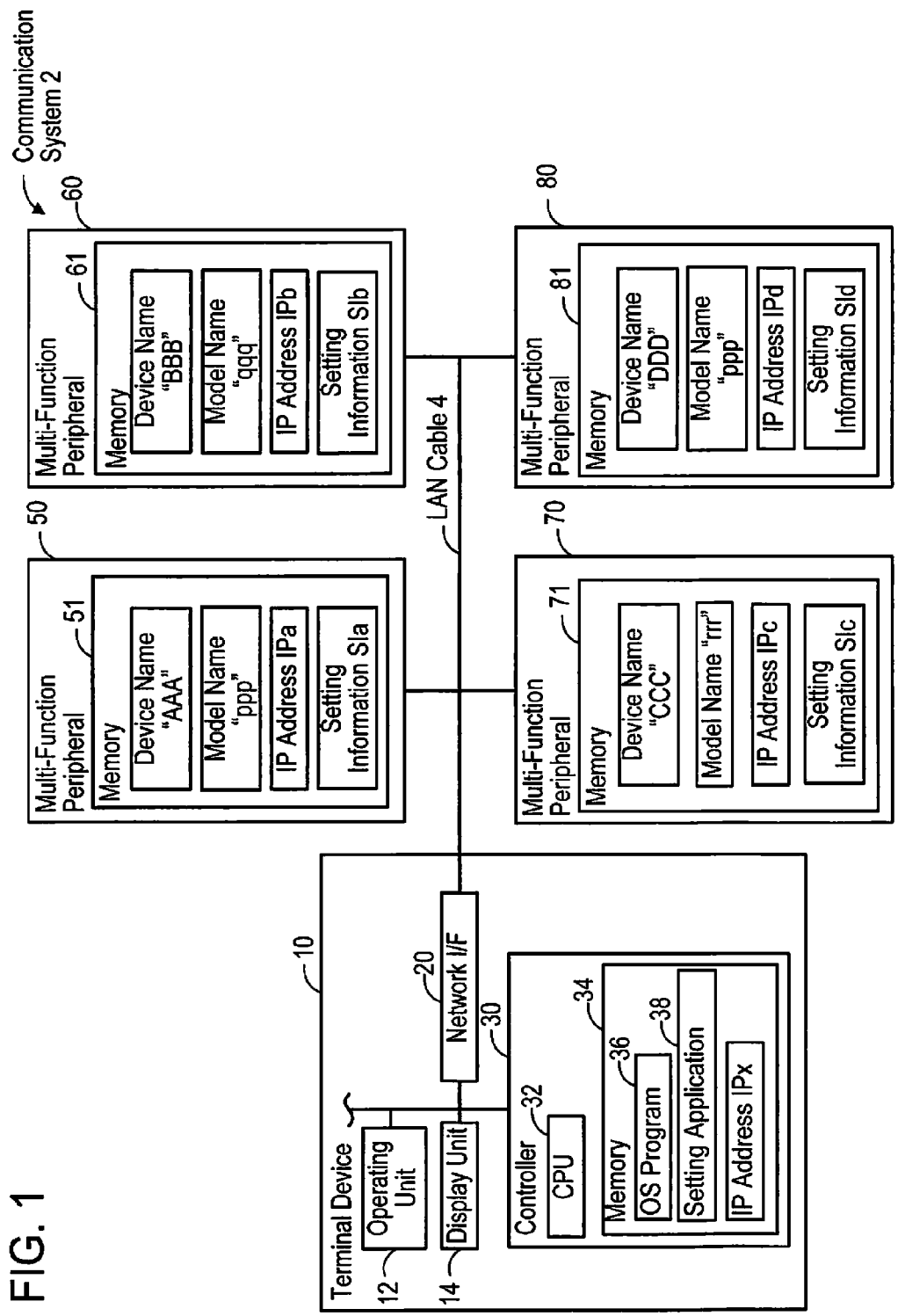
FIG. 1 illustrates a configuration of a communication system.

First Embodiment (Configuration of Communication System 2: FIG. 1)

A communication system 2 comprises a terminal device 10 and a plurality of multi-function peripherals 50, 60, 70, and 80. The respective devices 10 to 80 belong to a LAN (abbreviation of Local Area Network) and can communicate with each other via a LAN cable 4. In the following description, each multi-function peripheral will be referred to as "MFP (abbreviation of Multi-Function Peripheral)."

(Configuration of Terminal Device 10)

The terminal device 10 may be a portable device such as a mobile phone, a smartphone, a notebook PC, or a tablet PC and may be a stationary device such as a desktop PC or a television, for example. The terminal device 10 comprises an operating unit 12, a display unit 14, a network interface 20, and a controller 30. In the following description, the interface will be referred to as "I/F."

The operating unit 12 is configured of a plurality of keys. A user can input various instructions to the terminal device 10 by operating the operating unit 12. The display unit 14 is a display for displaying various items of information. The LAN cable 4 is connected to the network I/F 20. The controller 30 can communicate with the respective MFPs 50 and the like via the network I/F 20 (that is, the LAN cable 4). In the present embodiment, the network I/F 20 is an I/F for executing wired communication. In a modification, the network I/F 20 may be an I/F for executing wireless communication.

The controller 30 comprises a CPU 32 and a memory 34. The CPU 32 is a processor that executes various processes in accordance with programs 36 and 38 stored in the memory 34. The memory 34 is configured of a RAM, a ROM, and the like. The memory 34 stores a setting application 38 and an IP (abbreviation of Internet Protocol) address IPx in addition to an OS (abbreviation of Operating System) program 36 for realizing basic processes. The setting application 38 is an application provided by a vendor of the MFPs 50 to 80 and may be installed in the terminal device 10 from a server on the Internet and may be installed in the terminal device 10 from a medium delivered together with any one of the MFPs 50 to 80. In the following description, the setting application 38 will be referred to as "setting App 38." The IP address IPx is an IP address allocated to the terminal device 10. The IP address IPx is automatically allocated to the terminal device 10 by a DHCP (abbreviation of Dynamic Host Configuration Protocol) server (not shown) that belongs to the LAN, for example.

(Configuration of MFPs 50 to 80)

Each of the MFPs 50 to 80 is a peripheral device (that is, a peripheral device of the terminal device 10 or the like) that can execute multiple functions including a print function, a scan function, a facsimile (hereinafter referred to as "FAX") function, and the like. The MFP 50 comprises a memory 51 that stores respective items of information (that is, a device name "AAA," a model name "ppp," an IP address IPa, and setting information SIa) related to the MFP 50. The device name "AAA" is a name (that is, a device name) for identifying the MFP 50. The model name "ppp" is a name indicating a model of the MFP 50. The device name "AAA" is a unique name allocated to the MFP 10 by an administrator of the communication system 2, but the model name device name "ppp" is not a unique name. That is, although the device name "AAA" cannot be allocated to a MFP different from the MFP 50, a MFP (for example, a MFP 80) different from the MFP 50 may have the same model name "ppp" as the MFP 50.

Similarly to the MFP 50, the MFP 60 comprises a memory 61 that stores respective items of information (that is, a device name "BBB," a model name "qqq," an IP address IPb, and setting information SIb) related to the MFP 60. The MFP 70 comprises a memory 71 that stores respective items of information (that is, a device name "CCC," a model name "rrr," an IP address IPc, and setting information SIc) related to the MFP 70. The MFP 80 comprises a memory 81 that stores respective information (that is, a device name "DDD," a model name "ppp," an IP address IPd, and setting information SId) related to the MFP 80. The MFP 80 has the same model name "ppp" as the MFP 50 and the MFPs 60 and 70 have different model names from the MFP 50.

Figure 2:
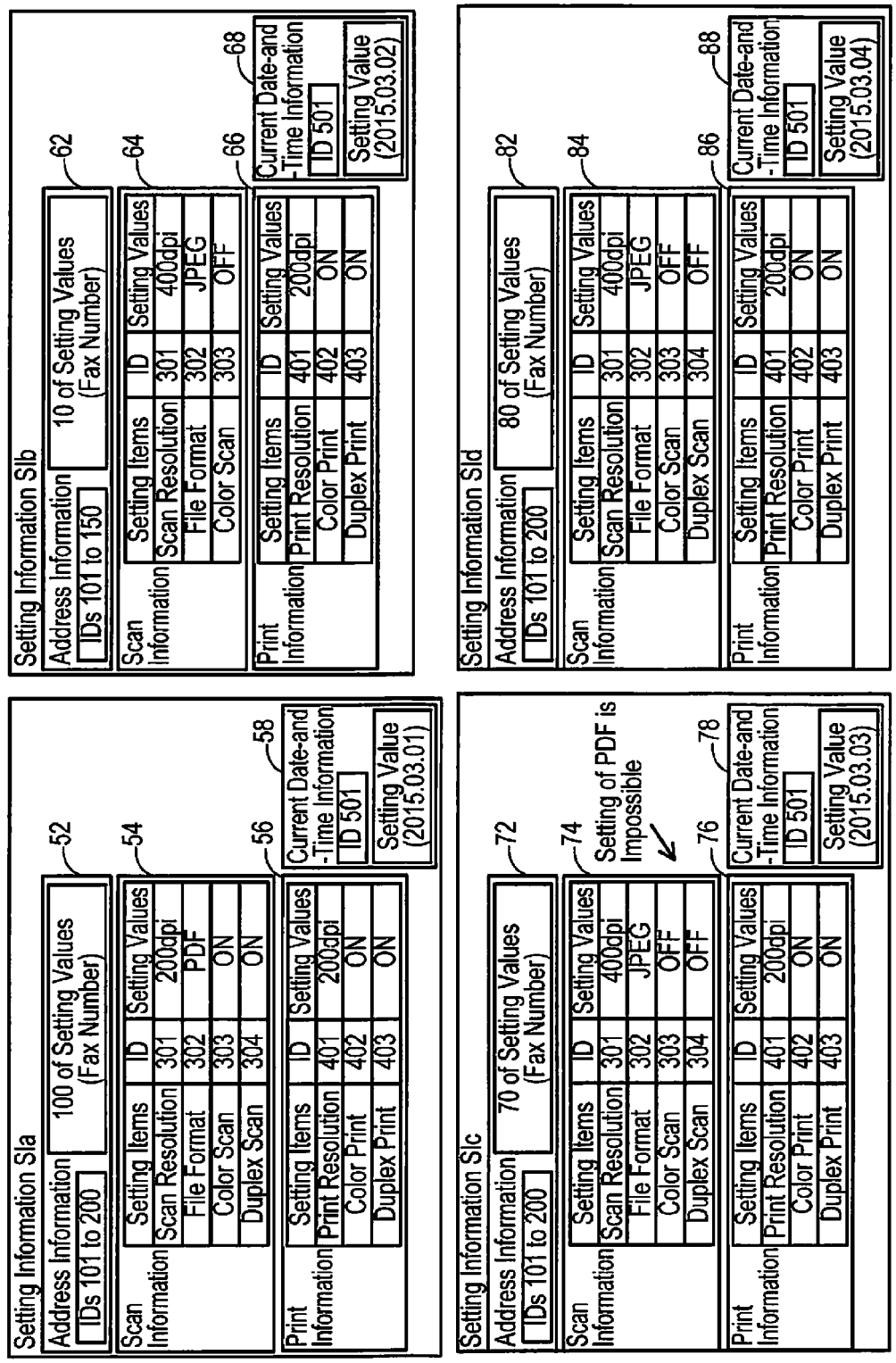
FIG. 2 illustrates an example of items of setting information in each multi-function peripheral.

(Contents of Setting Information: FIG. 2)

Subsequently, the contents of the respective items of setting information SIa to SId in the respective MFPs 50 to 80 will be described with reference to FIG. 2. The setting information SIa of the MFP 50 includes address information 52, scan information 54, print information 56, current date-and-time information 58.

The address information 52 is information indicating the address used for executing fax communication. The address information 52 includes 100 IDs "101" to "200." This means that the MFP 50 can store 100 setting values (that is, FAX numbers) corresponding to 100 IDs at most. In the present embodiment, the address information 52 includes 100 setting values that is the most.

The scan information 54 is information indicating a default scan setting for executing a scan of document. The scan information 54 includes four IDs "301" to "304" and four setting values. Specifically, the ID "301" is correlated with a setting value (in the example of FIG. 2, "200 dpi") indicating a scan resolution. The scan resolution "200 dpi" means that the MFP 50 executes scan at 200 dpi unless a scan execution instruction indicating other scan resolutions is accepted. The MFP 50 can use "200 dpi" or "400 dpi" as the scan resolution. The ID "302" is correlated with a setting value (in the example of FIG. 2, "PDF (abbreviation of Portable Document Format)") indicating a file format. The file format "PDF" means that the MFP 50 generates scan data having a PDF format unless a scan execution instruction indicating other file formats is accepted. The MFP 50 can use "PDF" or "JPEG (abbreviation of Joint Photographic Experts Group)" as the file format. The ID "303" is correlated with a setting value (in the example of FIG. 2, "ON") related to color scan. The color scan "ON" means that the MFP 50 executes color scan unless a scan execution instruction indicating monochrome scan is accepted. In a case where a color scan "OFF" is set, the MFP 50 executes monochrome scan unless a scan execution instruction indicating color scan is accepted. The ID "304" is correlated with a setting value (in the example of FIG. 2, "ON") related to duplex scan. The duplex scan "ON" means that the MFP 50 executes duplex scan unless a scan execution instruction indicating single-side scan is accepted. In a case where a duplex scan "OFF" is set, the MFP 50 executes single-side scan unless a scan execution instruction indicating duplex scan accepted.

The print information 56 is information indicating a default print setting for executing print. The print information 56 includes three IDs "401" to "403" and three setting values. The ID "401" is correlated with a setting value (in the example of FIG. 2, "200 dpi") indicating a print resolution. The print resolution "200 dpi" means that the MFP 50 executes print at 200 dpi unless a print execution instruction indicating other print resolutions is accepted. The MFP 50 can use "200 dpi" or "400 dpi" as the print resolution. The ID "402" is correlated with a setting value (in the example of FIG. 2, "ON") related to color print. The color print "ON" means that the MFP 50 executes color print unless a print execution instruction indicating monochrome print is accepted. In a case where a color print "OFF" is set, the MFP 50 executes monochrome print unless a print execution instruction indicating color print is accepted. The ID "403" is correlated with a setting value (in the example of FIG. 2, "ON") related to duplex print. The duplex print "ON" means that the MFP 50 executes duplex print unless a print execution instruction indicating single-side print is accepted. In a case where the duplex print "OFF" is set, the MFP 50 executes single-side print unless a print execution instruction indicating duplex print is accepted.

The current date-and-time information 58 includes an ID "501" and a setting value (in the example of FIG. 2, "2015.03.01") indicating a current date and a current time.

The setting information SIb of the MFP 60 includes address information 62, scan information 64, print information 66, and current date-and-time information 68. The address information 62 includes 50 IDs "101" to "150" and can include 50 setting values (that is, FAX numbers) at most. In the present embodiment, the address information 62 includes 10 setting values corresponding to 10 IDs "101" to "110." The scan information 64 is the same as the information 54 of the MFP 50. However, since the MFP 60 does not have a duplex scan function, the scan information 64 does not include the ID 304 and a setting value related to duplex scan. Moreover, the MFP 60 is a model (that is, a model name "qqq") different from those of the MFP 50 and can use scan resolutions (that is, "200 dpi," "400 dpi," and "600 dpi") different from those of the MFP 50. The MFP 60 can use the same file formats (that is, "PDF" and "JPEG") as the MFP 50. The print information 66 and the current date-and-time information 68 are the same as information 56 and 58 of the MFP 50, respectively.

The setting information SIc of the MFP 70 includes address information 72, scan information 74, print information 76, and current date-and-time information 78. The address information 72 includes 100 IDs "101" to "200" and can include 100 setting values at most. In the present embodiment, the address information 72 includes 70 setting values corresponding to 70 IDs "101" to "170." The scan information 74 is the same as the information 54 of the MFP 50. However, the MFP 70 is a model (that is, a model name "rrr") different from that of the MFP 50 and cannot use the file format "PDF." Thus, "JPEG" can be set in correlation with the ID 302 but "PDF" cannot be set in correlation with the ID 302. Moreover, the MFP 70 can use the same scan resolutions (that is, "200 dpi" and "400 dpi") as those of the MFP 50. The print information 76 and the current date-and-time information 78 are the same as the information 56 and 58 of the MFP 50, respectively.

The setting information Sid of the MFP 80 includes address information 82, scan information 84, print information 86, and current date-and-time information 88. The respective items of information 82 to 88 are the same as the respective items of information 52 to 58 of the MFP 50, respectively. In the present embodiment, the address information 82 includes 80 setting values corresponding to 80 IDs "101" to "180." Since the MFP 80 is the same model (that is, a model name "ppp") as the MFP 50, the MFP 80 can use the same settings as those of the MFP 50.

Figure 3:
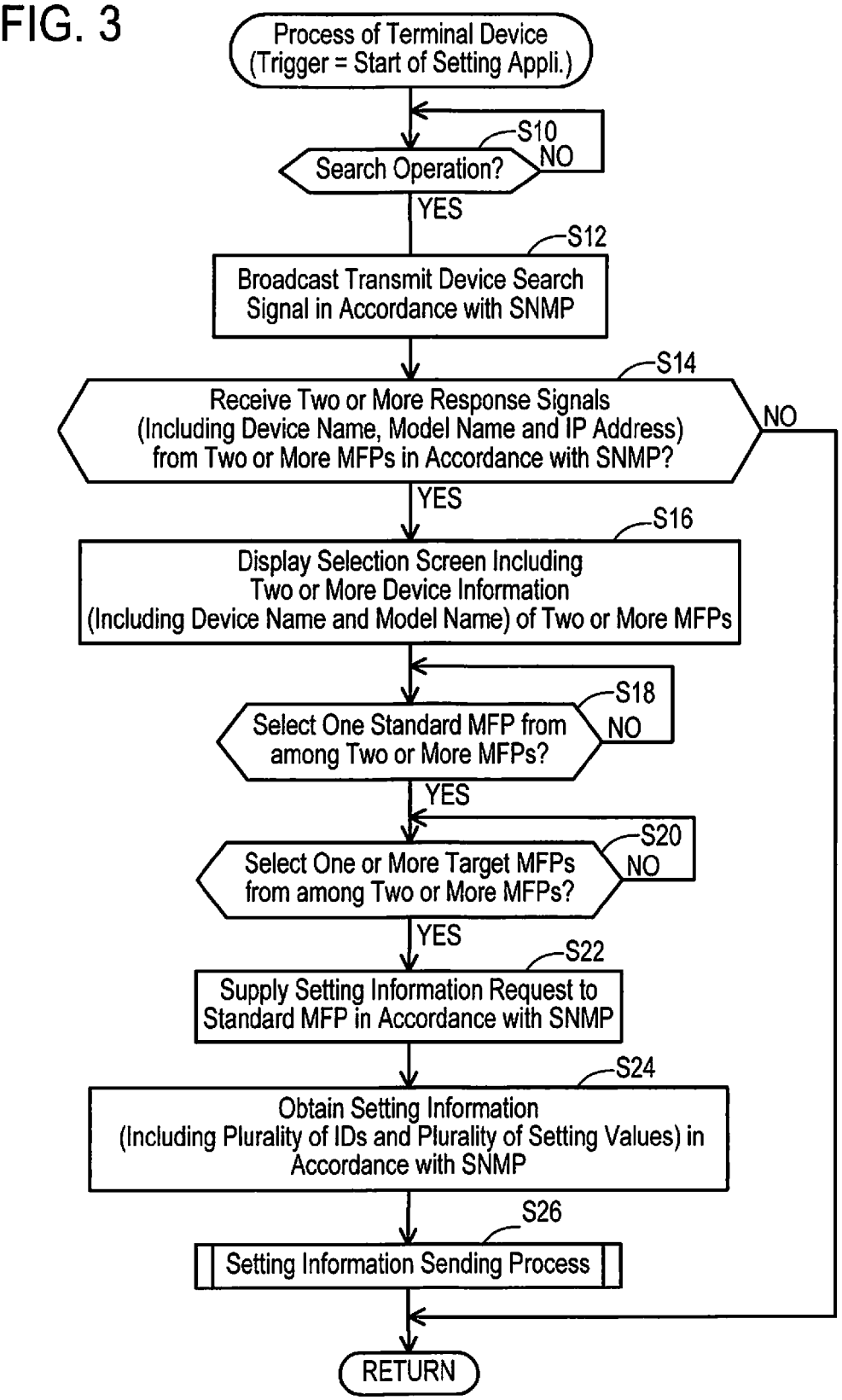
FIG. 3 illustrates a flowchart of processes executed by a terminal device.

(Processes of Terminal Device 10: FIG. 3)

Subsequently, contents of processes executed by the CPU 32 of the terminal device 10 will be described with reference to FIG. 3. The processes of FIG. 3 are executed in accordance with the setting App 38 when the setting App 38 is started by a user as a trigger for the processes.

In S10, the CPU 32 monitors an acceptance of a search operation. The search operation is an operation that a user executes on the operating unit 12 in order to search an MFP belonging to the same LAN as the terminal device 10. In a case where the search operation is accepted (S10: YES), the CPU 32 proceeds to S12.

In S12, the CPU 32 broadcast-transmits a device search signal (specifically, a GET request in SNMP) including the IP address IPx of the terminal device 10 in accordance with SNMP. Upon receiving the device search signal, each of the MFPs 50 to 80 belonging to the same LAN as the terminal device 10 sends a response signal including the device name, the model name, and the IP address of the MFP to the terminal device 10 in accordance with the SNMP.

In S14, the CPU 32 determines whether or not two or more response signals have been received from two or more pieces of MFPs. In a case of receiving two or more response signals (S14: YES), the CPU 32 proceeds to S16. On the other hand, in a case of receiving no response signal (S14: NO), or when only one response signal is received (S14: NO), the CPU 32 ends the processes of FIG. 3.

In S16, the CPU 32 causes the display unit 14 to display a selection screen including two or more items of device information corresponding to the two or more pieces of MFPs. Each item of the device information includes a device name and a model name in each response signal. As to each of the above two or more pieces of MFPs, the device name and the model name of the MFP are displayed on the selection screen in correlation with each other.

In S18, the CPU 32 monitors an acceptance of a reference MFP selection operation for selecting a reference MFP. The reference MFP is an MFP which is to supply the setting information to another MFP (that is, a target MFP described later) via the terminal device 10. The reference MFP selection operation is an operation that a user executes on the operating unit 12 in order to select one piece of reference MFP from the two or more pieces of MFPs. More specifically, the reference MFP selection operation is an operation of selecting device information of a reference MFP from among two or more items of device information on the selection screen. In a case of accepting the reference MFP selection operation (S18: YES), the CPU 32 proceeds to S20.

In S20, the CPU 32 monitors an acceptance of a target MFP selection operation. The target MFP is a MFP which is to obtain the setting information from the reference MFP via the terminal device 10. The target MFP selection operation is an operation that the user executes on the operating unit 12 in order to select one or more pieces of target MFPs from among the two or more pieces of MFPs. More specifically, the target MFP selection operation is an operation of selecting one or more items of device information of one or more pieces of target MFPs from among two or more items of device information on the selection screen. In a case of receiving the target MFP selection operation (S20: YES), the CPU 32 proceeds to S22.

In S22, the CPU 32 supplies a setting information request (specifically, a GET request in SNMP) for requesting sending of all items of setting information to the reference MFP in accordance with the SNMP. Specifically, the CPU 32 supplies a setting information request using the IP address of the reference MFP, as a destination, included in the response signal (see S14) received from the reference MFP.

In S24, the CPU 32 obtains setting information currently set to the reference MFP from the reference MFP in accordance with the SNMP. For example, when the reference MFP is the MFP 50, the CPU 32 obtains the setting information SIa (see FIG. 2) including 108 IDs (that is, IDs "101" to "200," "301" to "304," "401" to "403," and "501") and 108 setting values from the MFP 50. In S26, the CPU 32 executes a setting information sending process of FIG. 4 and returns to S10.

Figure 4:
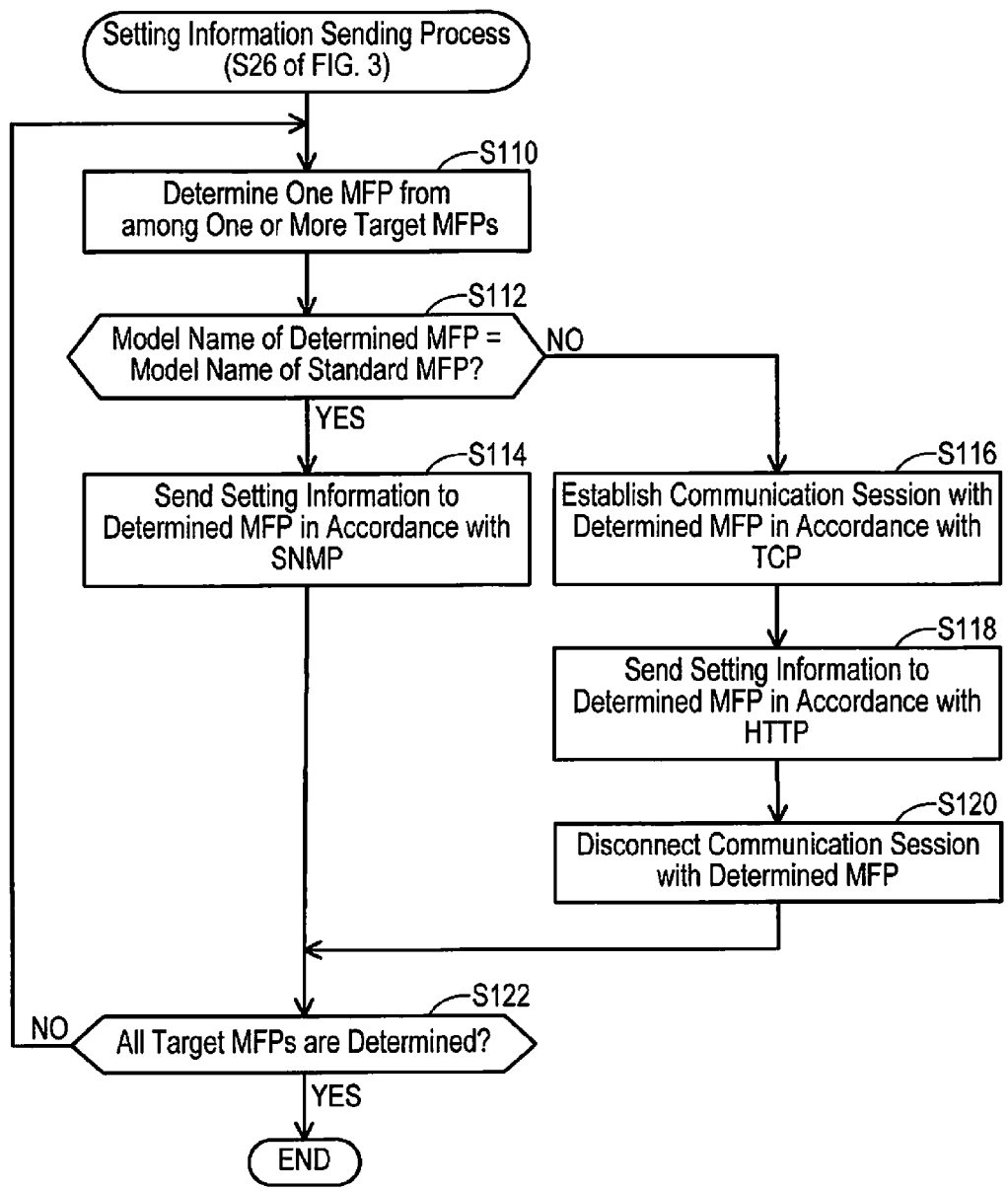
FIG. 4 illustrates a flowchart of a setting information sending process of a first embodiment.

(Setting Information Sending Process: FIG. 4)

Next, contents of the setting information sending process executed in S26 of FIG. 3 will be described with reference to FIG. 4. The setting information sending process is a process for sending the setting information obtained in S24 of FIG. 3 to the one or more target MFPs selected in S20. In particular, even when a further operation is not accepted from the user after the target MFP selection operation has been accepted (S20 of FIG. 3: YES), the CPU 32 sequentially sends the setting information to all of the one or more pieces of target MFPs.

In S110, the CPU 32 determines one piece of MFP from the one or more pieces of target MFPs. In S112, the CPU 32 determines whether or not the model name of the determined MFP is identical to the model name of the reference MFP. Specifically, in a case where the model name included in the response signal (see S14 of FIG. 3) received from the determined MFP is identical to the model name included in the response signal (see S14) received from the reference MFP (S112: YES), the CPU 32 proceeds to S114. On the other hand, in a case where the former model name is not identical to the latter model name (S112: NO), the CPU 32 proceeds to S116.

In S114, the CPU 32 sends the setting information (specifically, a SET request in SNMP) obtained in S24 of FIG. 3 to the determined MFP in accordance with the SNMP. Specifically, the CPU 32 sends the setting information using the IP address (hereinafter referred to as a "determined IP address") included in the response signal (see S14 of FIG. 3) received from the determined MFP as a destination. At this occasion, the CPU 32 sends one SET request, a plurality of IDs, and a plurality of setting values collectively rather than sequentially sending a combination of one SET request, one ID, and one setting value over a plurality of number of times. Thus, the CPU 32 can quickly send the setting information to the determined MFP in accordance with the SNMP. As a result of the process of S114, the plurality of setting values included in the setting information can be set to the determined MFP. When S114 ends, the flow proceeds to S122.

In S116, the CPU 32 establishes a communication session with the determined MFP in accordance with TCP (abbreviation of Transmission Control Protocol). Specifically, the CPU 32 sends to the determined MFP a first SYN (abbreviation of Synchronize) packet using the determined IP address as a destination and receives an ACK (abbreviation of Acknowledgement) packet which is a response to the first SYN packet from the determined MFP. Subsequently, the CPU 32 receives a second SYN packet from the determined MFP and sends an ACK packet which is a response to the second SYN packet to the determined MFP. In this way, a communication session is established between the terminal device 10 and the determined MFP.

In S118, the CPU 32 sends setting information (specifically, a SET request in HTTP) to the determined MFP in accordance with HTTP (abbreviation of Hypertext Transfer Protocol) using the communication session with the determined MFP. Specifically, the CPU 32 sends the setting information using the determined IP address as a destination. At this occasion, the CPU 32 sends one SET request, a plurality of IDs, and a plurality of setting values collectively rather than sequentially sending a combination of one SET request, one ID, and one setting value over a plurality of number of times. Thus, the CPU 32 can quickly send the setting information to the determined MFP in accordance with HTTP. As a result of the process of S118, all or a portion of the plurality of setting values included in the setting information can be set to the determined MFP. In a modification, the CPU 32 may send the setting information to the determined MFP in accordance with HTTPs (abbreviation of Hypertext Transfer Protocol Secure) instead of HTTP. According to this modification, the CPU 32 can execute more secure communication.

In S120, the CPU 32 disconnects the communication session with the determined MFP. Specifically, the CPU 32 sends a first FIN (abbreviation of Finish) packet to the determined MFP using the determined IP address as a destination and receives an ACK packet which is a response to the first FIN packet from the determined MFP. Moreover, the CPU 32 receives a second FIN packet from the determined MFP and sends an ACK packet which is a response to the second FIN packet to the determined MFP. In this way, a communication session between the terminal device 10 and the determined MFP is disconnected. When S120 ends, the flow proceeds to S122.

In S122, the CPU 32 determines whether or not all of one or more pieces of target MFPs have been determined in S110. When all of the one or more pieces of target MFPs have been determined (S122: YES), the CPU 32 ends the process of FIG. 4. On the other hand, in a case where any one of the one or more pieces of target MFPs has not been determined (S122: NO), the CPU 32 returns to S110 and determines another target MFP.

(Specific Cases: FIGS. 5 to 7)

Next, contents of specific cases realized in accordance with the flowcharts of FIGS. 3 and 4 will be described with reference to FIGS. 5 to 7. In FIGS. 5 and 6, communication in accordance with SNMP and communication in accordance with HTTP are indicated by a dashed-line arrow and a solid-line arrow, respectively.

The user of the terminal device 10 starts the setting App 38 in T10 (trigger in FIG. 3) and executes a search operation on the terminal device 10 in T12 (S10: YES).

In T14, the terminal device 10 broadcast-transmits the device search signal in accordance with SNMP (S12 in FIG. 3). In T16 to T19, the terminal device 10 receives, from each of the MFPs 50 to 80, a response signal including the respective information (that is, the device name, the model name, and the IP address) of the MFP in accordance with the SNMP (S14: YES). In T22, the terminal device 10 displays a selection screen including the device name and the model name of each of the MFPs 50 to 80 (S16).

The user selects the MFP 50 as the reference MFP in T24 (S18 in FIG. 3: YES) and selects three pieces of MFPs 60, 70, 80 as the target MFPs in T26 (S20: YES). In this case, the terminal device 10 supplies a setting information request to the MFP 50 in accordance with the SNMP in T28 (S22) and, in T30, obtains the setting information SIa from the MFP 50 in accordance with SNMP (S24). The setting information SIa includes 108 IDs (that is, IDs "101" to "200," "301" to "304," "401" to "403," and "501") and 108 setting values (see FIG. 2).

Subsequently, the flow proceeds to FIG. 6, and the terminal device 10 determines that the model name "qqq" of the MFP 60 is not identical to the model name "ppp" of the MFP 50 (S112 in FIG. 4: NO) and establishes a communication session with the MFP 60 in accordance with TCP in T110 (S116). In T112, the terminal device 10 sends the setting information SIa to the MFP 60 in accordance with the HTTP using the communication session with the MFP 60 (S118).

In a case of receiving the setting information SIa from the terminal device 10, the MFP 60 newly sets setting values in the received setting information SIa in place of the current setting values in the setting information SIb of the MFP 60. As shown in FIG. 2, the address information 62 in the setting information SIb of the MFP 60 can include 50 setting values corresponding to 50 IDs "101" to "150" at most. In contrast, the address information 52 in the received setting information SIa includes 100 IDs "101" to "200" and 100 setting values. Thus, the MFP 60 cannot newly set all of the new 100 setting values in the address information 52. In this case, the MFP 60 extracts each of 50 setting values corresponding to the 50 IDs "101" to "150" that the MFP 60 itself has within the address information 52 without each of extracting the setting values corresponding to the IDs "151" to "200" that the MFP 60 itself does not include. Moreover, the MFP 60 removes 10 setting values corresponding to 10 IDs "101" to "110" in the address information 62 from the memory 61 and then causes the memory 61 to store the extracted 50 setting values in correlation with the 50 IDs "101" to "150." As a result, as indicated by State 1 in FIG. 7, 50 setting values are newly set in place of 10 setting values as the address information 62 in the setting information SIb of the MFP 60.

Moreover, as shown in FIG. 2, the scan information 64 in the setting information SIb of the MFP 60 does not include an ID "304" corresponding to duplex scan and a setting value thereof. In contrast, the scan information 54 in the received setting information SIa includes the ID "304" and the setting value "ON." In this case, the MFP 60 extracts three setting values corresponding to three IDs "301" to "303" that the MFP 60 itself has within the scan information 54 without extracting the setting value "ON" corresponding to the ID "304" that the MFP 60 itself does not have. Moreover, the MFP 60 newly sets the extracted three setting values in place of the three setting values corresponding to the three IDs "301" to "303" in the scan information 64. As a result, scan information 64 indicated by "State 1" in FIG. 7 is newly set in place of the scan information 64 in the setting information SIb of FIG. 2. That is, the scan resolution corresponding to the ID "301" is changed from "400 dpi" to "200 dpi," the file format corresponding to the ID "302" is changed from "JPEG" to "PDF," and the color scan corresponding to the ID "303" is changed from "OFF" to "ON."

Moreover, the MFP 60 newly sets three setting values in the print information 56 included in the received setting information SIa in place of the three setting values in the print information 66 included in the setting information SIb. However, as shown in FIG. 2, since the print information 56 is perfectly identical to the print information 66, the three setting values in the print information 66 are not changed (see the information 66 indicated by State 1 in FIG. 7). Moreover, the MFP 60 newly sets a setting value (2015.03.01) in the current date-and-time information 58 included in the received setting information SIa in place of the setting value (2015.03.02) in the current date-and-time information 68 included in the setting information SIb (see the information 68 of State 1 in FIG. 7).

As a result of the process of T115 in FIG. 6, the MFP 60 newly sets 57 setting values corresponding to the IDs "101" to "150," "301" to "303," "401" to "403," and "501" in the setting information SIb from among the 108 setting values in the received setting information SIa and does not set 51 setting values corresponding to the IDs "151" to "200" and "304." In T116, the terminal device 10 disconnects the communication session with the MFP 60 (S120 in FIG. 4).

Subsequently, the terminal device 10 determines that the model name "rrr" of the MFP 70 is not identical to the model name "ppp" of the MFP 50 (S112 in FIG. 4: NO) and establishes a communication session with the MFP 70 in accordance with TCP in T118 (S116). In T120, the terminal device 10 sends the setting information SIa to the MFP 70 in accordance with HTTP using the communication session with the MFP 70 (S118).

In T122, similarly to T115 executed by the MFP 60, the MFP 70 newly sets setting values in the received setting information SIa in place of the current setting values in the setting information SIc of the MFP 70. State 2 of FIG. 7 shows the setting information SIc in which the setting values have been newly set. A state of the address information 72 in which 70 setting values are included is changed to a state in which 100 setting values which are the largest capacity are included. Moreover, the file format in the scan information 54 included in the received setting information SIa is "PDF" (see FIG. 2). However, the MFP 70 cannot use the file format "PDF" as described above. Thus, the MFP 70 does not change the file format corresponding to the ID "302" from "JPEG" to "PDF."

As a result of the process of T122 in FIG. 6, the MFP 70 newly sets 107 setting values excluding one setting value corresponding to the ID "302" from among the 108 setting values included in the setting information SIa. In T124, the terminal device 10 disconnects the communication session with the MFP 70 (S120 in FIG. 4).

Subsequently, the terminal device 10 determines that the model name "ppp" of the MFP 80 is identical to the model name "ppp" of the MFP 50 (S112: YES) and sends the setting information SIa to the MFP 80 in accordance with the SNMP in T126 (S114). Since the terminal device 10 does not need to establish a communication session with the MFP 80, it is possible to more quickly send the setting information SIa to the MFP 80 as compared to a configuration in which the setting information SIa is sent to the MFP 80 in accordance with the HTTP.

In T128, the MFP 80 newly sets each of setting values in the received setting information SIa in place of each of the current setting values in the setting information SId of the MFP 80. State 3 in FIG. 7 indicates the setting information SId in which the setting values have been newly set. According to the SNMP specifications, if a MFP does not have a part of IDs from among a plurality of IDs designated by one SET request, the MFP cannot set all of a plurality of setting values corresponding to the plurality of IDs, not only setting value(s) corresponding to the part of IDs. This is one of the differences from the HTTP specifications (see T115). Moreover, according to the SNMP specifications, if a MFP cannot use a setting value corresponding to a specific ID although the MFP includes the specific ID from among a plurality of setting values designated by one SET request, all of the plurality of setting values, not only the setting value corresponding to the specific ID, are not set. This is one of the differences from the HTTP specifications (see T122). However, since the MFP 80 is the same model as the MFP 50, the MFP 80 includes all of the plurality of IDs (that is, 108 IDs) included in the setting information SIa of the MFP 50 and can use all of the plurality of setting values corresponding to the plurality of IDs. Thus, the MFP 80 can newly set all of the setting values in the received setting information SIa.

(Advantages of First Embodiment)

According to the present embodiment, the terminal device 10 sends in accordance with HTTP the setting information SIa including 108 setting values to the MFPs 60 and 70 (T112 and T120 of FIG. 6) even without accepting a further operation from the user after a target MFP selection operation of selecting the three MFPs 60, 70, and 80 as target MFPs has been accepted (T26 of FIG. 5). Since the 108 setting values are sent in accordance with the HTTP, even when a part of the 108 setting values cannot be set to the MFP 60, the other setting values are set to the MFP 60 (T115). Similarly, even when a part of the 108 setting values cannot be set to the MFP 70, the other setting values are set to the MFP 70 (T122). That is, the terminal device 10 can respectively set one or more setting values to the MFPs 60 and 70 appropriately.

In SNMP, a situation in which a setting target device does not have a part of a plurality of IDs included in a PUT command is not taken into consideration. Moreover, a situation in which a setting target device cannot use setting value(s) corresponding to a part of plurality of IDs included in a PUT command is not taken into consideration, either. Thus, it is not defined in SNMP to set only the other setting values excluding a part of setting values that cannot be changed, from among the plurality of setting values corresponding to the plurality of IDs to the setting target device in such a situation. On the other hand, to begin with, it is not expected in HTTP to use the HTTP for a purpose of setting a setting value to a setting target device. Thus, no restrictions in using the HTTP for such a purpose are defined. Thus, the use of HTTP can enable a vendor of the MFPs 60 and 70 to easily realize the configuration of setting only the other setting values excluding the part of setting values that cannot be changed. That is, the vendor can easily install a program for executing a process that realizes such a configuration into the MFPs 60 and 70. Moreover, if the vendor provides the setting App 38 for executing changing of settings in accordance with HTTP, it is possible to realize a configuration in which the terminal device 10 executes the changing of settings of the MFPs 60 and 70 in accordance with HTTP, similarly to the present embodiment.

Moreover, according to the present embodiment, since the MFPs 60 and 70 have model names that are not identical to the model name "ppp" of the MFP 50, the terminal device 10 sends the 108 setting values to the MFPs 60 and 70 in accordance with HTTP (T112 and T120 of FIG. 6). As described above, even when a part of the 108 setting values cannot be set to the MFPs 60 and 70, the other setting values are set to the MFPs 60 and 70 (T115 and T122). On the other hand, since the MFP 80 has the model name that is identical to the model name "ppp" of the MFP 50, the terminal device 10 sends the 108 setting values to the MFP 80 in accordance with the SNMP (T126). Since the MFP 80 is the same model as the MFP 50, all setting values (that is, 108 setting values) used in the MFP 50 can generally be set to the MFP 80. Thus, all of the 108 setting values are set to the MFP 80 (T128). In particular, since the terminal device 10 does not need to establish a communication session, it is possible to more quickly send the setting values to the MFP 80 as compared to a case of sending the setting values in accordance with the HTTP. In this manner, since the terminal device 10 changes its communication protocol depending on whether or not the target MFP has a model name identical to the model name "ppp" of the MFP 50, it is possible to appropriately set one or more setting values to the MFPs 60 to 80 which are target MFPs.

(Correspondence Relationships)

HTTP and SNMP are examples of a "first communication protocol" and a "second communication protocol," respectively. The terminal device 10 and the MFP 50 which is the reference MFP are examples of a "communication device" and a "particular device," respectively. The MFPs 50 to 80 are examples of "M items of devices." The MFPs 60 to 80 which are target MFPs are examples of a "target device." The MFPs 60 and 70 are examples of a "first device" and a "second device," respectively. The 108 setting values in the setting information SIa are examples of a "plurality of setting values." The setting values in the address information 52, the setting values in the scan information 54, and the setting value in the current date-and-time information 58 are examples of an "address setting value," a "scan setting value," and a "date and time setting value," respectively. The setting information request in S22 of FIG. 3 is an example of a "request signal."

Second Embodiment: FIG. 8

In the present embodiment, a setting information sending process of FIG. 8 is executed instead of the setting information sending process of FIG. 4. In S210, the CPU 32 broadcast-transmits, in accordance with SNMP, the setting information (specifically, a SET request of SNMP) obtained in S24 of FIG. 3.

In S212, the CPU 32 determines whether or not one or more NG notifications have been received from one or more MFPs. The NG notification is a notification indicating that at least one setting value from among a plurality of setting values in setting information cannot be set and the NG notification includes an IP address of a sender MFP that sent the NG notification. In a case of receiving one or more NG notifications (S212: YES), the CPU 32 proceeds to S214. On the other hand, in a case of receiving no NG notification (S212: NO), the CPU 32 ends the process of FIG. 8.

In S214, the CPU 32 determines one MFP from among MFPs which are senders of the NG notifications. In S216, the CPU 32 determines whether or not the determined MFP is any one of the one or more target MFPs selected in S20 of FIG. 3. Specifically, in a case where an IP address of the determined MFP is identical to any one of one or more IP addresses of the one or more target MFPs (S216: YES), the CPU 32 proceeds to S218. On the other hand, in a case where the IP address of the determined MFP is not identical to any one of one or more IP addresses of the one or more target MFPs (S216: NO), the CPU 32 proceeds to S224. S218 to S222 are the same as S116 to S120 of FIG. 4.

In S224, the CPU 32 determines whether or not all of the one or more MFPs which are senders of the one or more NG notifications have been determined in S214. In a case where all of the one or more MFPs have been determined (S224: YES), the CPU 32 ends the process of FIG. 8. On the other hand, in a case where any one of the one or more MFPs has not been determined (S224: NO), the CPU 32 returns to S214 and determine another MFP.

Figure 9:
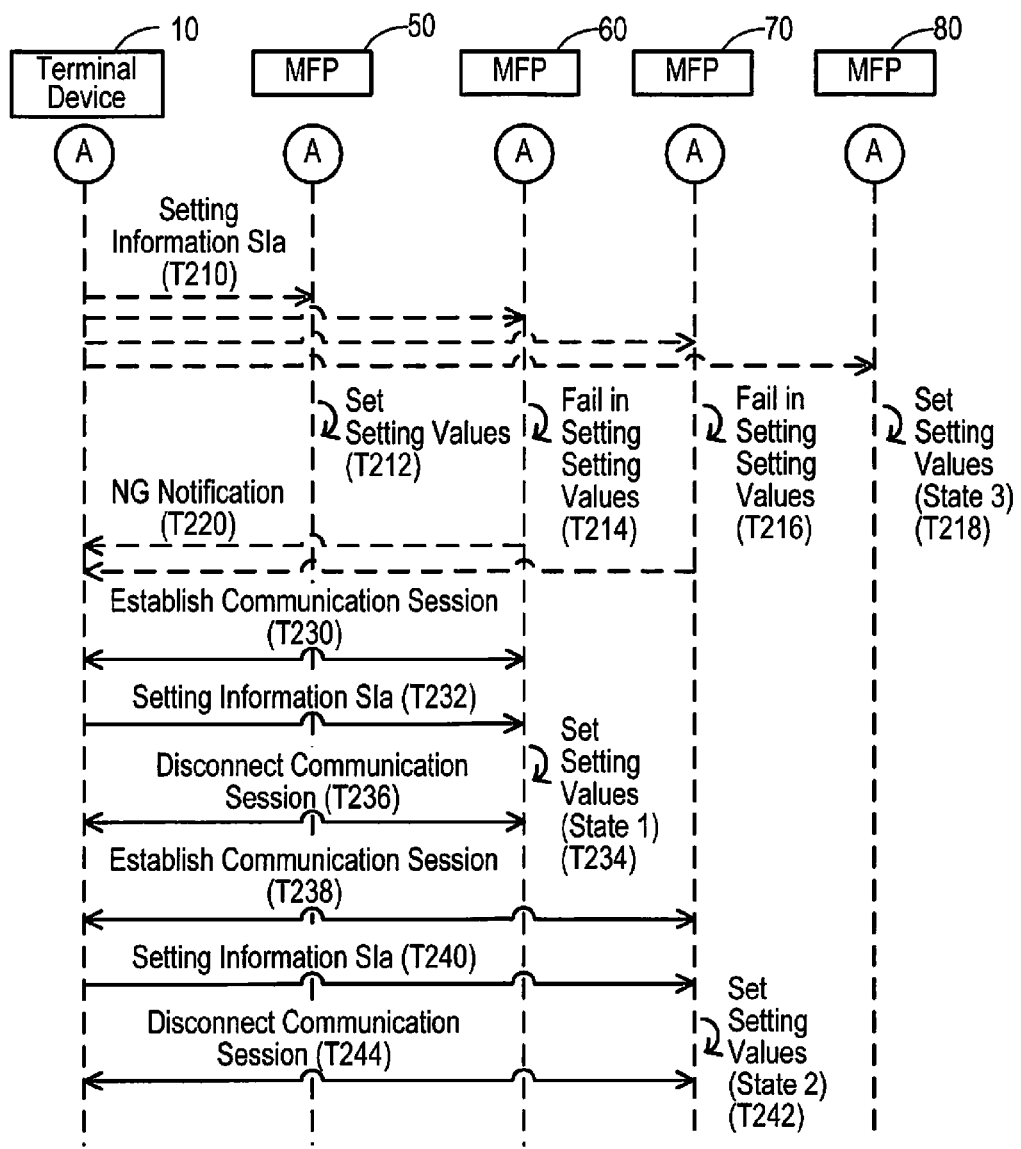
FIG. 9 illustrates a sequence diagram of a specific case of the second embodiment.

(Specific Case: FIG. 9)

Next, a content of a specific case realized according to the flowchart of FIG. 8 will be described with reference to FIG. 9. FIG. 9 is a case continuous from FIG. 5. In T210 of FIG. 9, the terminal device 10 broadcast-transmits the setting information SIa in accordance with SNMP (S210 of FIG. 8).

In a case of receiving the setting information SIa from the terminal device 10, the MFP 50 newly sets the setting values in the received setting information SIa in place of the current setting values in the setting information SIa of the MFP 50 in T212. However, since the setting information SIa is the setting information of the MFP 50, the content of the setting information SIa of the MFP 50 does not change.

In a case of receiving the setting information SIa from the terminal device 10, the MFP 60 tries to newly set, in T214, the setting values in the received setting information SIa in place of the current setting values in the setting information SIb. However, since a part (51 setting values corresponding to the IDs "151" to "200" and "304") from among the 108 setting values in the setting information SIa cannot be set, any one of the 108 setting values is not set. That is, the MFP 60 fails in setting the setting values.

In a case of receiving the setting information SIa from the terminal device 10, the MFP 70 tries to newly set, in T216, the setting values in the received setting information SIa in place of the current setting values in the setting information SIc. However, since a part (that is, the file format "PDF" corresponding to the ID "302") from among the 108 setting values in the setting information SIa cannot be set, any one of the 108 setting values is not set. That is, the MFP 70 fails in setting the setting values.

T218 is the same as T128 of FIG. 6. That is, the setting information SId of the MFP 80 is changed to State 3 in FIG. 7. On the other hand, since the MFPs 60 and 70 have failed in setting the setting values, NG notifications are sent from each of the MFPs 60 and 70 to the terminal device 10 in T220.

In a case of receiving a NG notification from the MFP 60, the terminal device 10 determines that the MFP 60 is a target MFP (S216: YES), and as a result, T230 to T236 are executed (S218 to S222). T230 to T236 are the same as T110 to T116 of FIG. 6. Moreover, in a case of receiving an NG notification from the MFP 70, the terminal device 10 determines that the MFP 70 is a target MFP (S216: YES), and as a result, T238 to T244 are executed (S218 to S222). T238 to T244 are the same as T118 to T126 of FIG. 6.

(Advantages of Second Embodiment)

The present embodiment can provide the same advantages as the first embodiment. That is, the terminal device 10 can appropriately set one or more setting values to each of the MFPs 60 and 70. Moreover, since the terminal device 10 changes a communication protocol depending on whether or not a target MFP has a model name identical to the model name "ppp" of the MFP 50, the terminal device 10 can appropriately set one or more setting values to the MFPs 60 to 80 which are target MFPs.

(Modification 1)

In the embodiments described above, the CPU 32 of the terminal device 10 executes the processes of FIGS. 3, 4, and 8, but instead of this, the MFP 50 may execute the processes of FIGS. 3, 4, and 8, for example. In this case, the process of S18 in FIG. 3 can be omitted. Moreover, the MFP 50 may obtain the setting information SIa by reading the setting information SIa from the memory 51 of the MFP 50 instead of executing the processes of S22 and S24. Moreover, the MFP 50 may obtain the model name "ppp" by reading the model name "ppp" from the memory 51. That is, a "particular device" may be a "communication device" and a "supplying of a request signal" can be omitted.

(Modification 2)

In the embodiments described above, the CPU 32 of the terminal device 10 executes communication in accordance with SNMP in S22 and S24 of FIG. 3, but instead of this, the CPU 32 may execute communication in accordance with HTTP. That is, in the "supplying of a request signal" and the "obtaining of the plurality of setting values," communication may not be executed in accordance with the "second protocol."

(Modification 3)

In the second embodiment, the CPU 32 of the terminal device 10 may unicast or multicast the setting information to each target MFP in accordance with SNMP in S210 of FIG. 8. That is, the CPU 32 may not broadcast-transmit the plurality of setting values. In this modification, since the determined MFP is any one of one or more target MFPs, S216 can be omitted.

(Modification 4)

In the embodiments described above, the CPU 32 of the terminal device 10 broadcast-transmits the device search signal in S12 of FIG. 3 and receives a response signal including the device name, the model name, and the IP address in S14. Instead of this, for example, in a case where respective items of information such as the device name, the model name, and the IP address of each of the MFPs 50 to 80 are stored in advance in the memory 34, the CPU 32 may read the items of information from the memory 34. Moreover, in another modification, the CPU 32 may obtain the respective items of information from a server that stores the respective items of information. That is, the "broadcast-transmitting of a device search signal," the "receiving of a device name," the "receiving of a model name," and the "obtaining of a model name" can be omitted.

(Modification 5)

In the embodiments described above, the setting information SIa includes the address information 52, the scan information 54, and the current date-and-time information 58. However, in a modification, the setting information SIa may include at least one of the items of information 52, 54, and 58. That is, the "plurality of setting values" may include at least one of an "address setting value," a "scan setting value," and a "date-and-time setting value." Moreover, in another modification, the setting information SIa may not include any one of the items of information 52, 54, and 58. That is, the "plurality of setting values" may not include the "address setting value," the "scan setting value," and the "date-and-time setting value" but may include another setting value (for example, the information 56).

(Modification 6)

In the first embodiment, the CPU 32 of the terminal device 10 sends all of the items of setting information obtained from the reference MFP to the determined MFP in S114 and S118 of FIG. 4. However, instead of this, the CPU 32 may send only a part of the items of setting information to the determined MFP. For example, the CPU 32 may send a part of the IDs and a part of the setting values selected by the user from among the plurality of IDs and the plurality of setting values included in the setting information to the determined MFP.

(Modification 7)

A "communication device" is not limited to a terminal device but may be a MFP, a printer, a scanner, a server, or the like. That is, the "communication device" includes all devices that can communicate with another device. A "M pieces of devices" (that is, including the "first device" and the "second device") and a "target device" are not limited to the MFP, but may be a printer, a scanner, a PC, a server, or the like. That is, the "M pieces of devices" and the "target device" include any kinds of devices to which a plurality of setting values can be set.

(Modification 8)

In the embodiments described above, the respective processes illustrated in FIGS. 3 to 6, 8, and 9 are realized by the CPU 32 of the terminal device 10 executing a program (that is, software). Instead of this, at least one of these respective processes may be realized by hardware such as a logical circuit.

What is claimed is:

1. A non-transitory computer-readable storage medium storing computer-readable instructions for a communication device, wherein the computer-readable instructions, when executed by a processor of the communication device, cause the communication device to perform:

accepting a registering operation performed by a user for registering a plurality of setting values related to a plurality of setting items in M pieces of devices different from the communication device, the M being an integer equal to two or more, the M pieces of devices including a first device and a second device, a model name of the first device being different from a model name of the second device, the plurality of setting items including a specific setting item which is a predetermined registrable setting item in the first device and a predetermined unregistrable setting item in the second device;

establishing a communication session with the first device without accepting a further operation from the user after the registering operation has been accepted;

sending the plurality of setting values to the first device by using the communication session with the first device in accordance with a first communication protocol in conformity to HTTP (an abbreviation of Hypertext Transfer Protocol), wherein in the first device, in a case where the plurality of setting values is received from the communication device, a first part of the plurality of setting values is registered and a first remaining part of the plurality of setting values is not registered, the first part of the plurality of setting values being values related to a first part of the plurality of setting items including the specific setting item, the first part of the plurality of setting items being predetermined registrable setting items in the first device, the first remaining part of the plurality of setting values being values related to a first remaining part of the plurality of setting items which does not include the specific setting item, the first remaining part of the plurality of setting items being predetermined unregistrable setting items in the first device;

disconnecting the communication session with the first device after the plurality of setting values has been sent to the first device;

establishing a communication session with the second device without accepting a further operation from the user after the registering operation has been accepted;

sending the plurality of setting values to the second device by using the communication session with the second device in accordance with the first communication protocol, wherein in the second device, in a case where the plurality of setting values is received from the communication device, a second part of the plurality of setting values is registered and a second remaining part of the plurality of setting values is not registered, the second part of the plurality of setting values being values related to a second part of the plurality of setting items which does not include the specific setting item, the second part of the plurality of setting items being predetermined registrable setting items in the second device, the second remaining part of the plurality of setting values being values related to a second remaining part of the plurality of setting items including the specific setting items, the second remaining part of the plurality of setting items being predetermined unregistrable setting items in the second device; and disconnecting the communication session with the second device after the plurality of the setting values has been sent to the second device.

2. The non-transitory computer-readable storage medium as in claim 1, wherein the computer-readable instructions, when executed by the processor of the communication device, further cause the communication device to perform:

obtaining the plurality of setting values from a memory of a particular device in which the plurality of setting values is currently registered, and wherein the obtained plurality of setting values is sent to the first device and the second device.

3. The non-transitory computer-readable storage medium as in claim 2, wherein the particular device is different from the communication device, the computer-readable instructions, when executed by the processor of the communication device, further cause the communication device to perform:

supplying the particular device with a request signal for requesting the plurality of setting values, wherein the plurality of setting values is obtained from the memory of the particular device in response to supplying the request signal.

4. The non-transitory computer-readable storage medium as in claim 3, wherein the request signal is supplied in accordance with a second communication protocol in conformity to SNMP (an abbreviation of Simple Network Management Protocol), and the plurality of the setting values is obtained from the memory of the particular device in accordance with the second communication protocol in response to supplying the request signal.

5. The non-transitory computer-readable storage medium as in claim 2, wherein
the computer-readable instructions, when executed by the processor of the communication device, further cause the communication device to perform:
receiving, from each of the M pieces of devices, a model name of the device; and
obtaining, from the memory of the particular device, a model name of the particular device,
wherein the establishing of the communication session with the first device includes:
determining whether a model name of the first device included in M pieces of model names received from the M pieces of devices is identical to the model name of the particular device; and
establishing the communication session with the first device in a case where it is determined that the model name of the first device is not identical to the model name of the particular device,
the communication session with the first device is not established in a case where it is determined that the model name of the first device is identical to the model name of the particular device,
wherein the establishing of the communication session with the second device includes:
determining whether a model name of the second device included in the M pieces of model names is identical to the model name of the particular device; and
establishing the communication session with the second device in a case where it is determined that the model name of the second device is not identical to the model name of the particular device,
the communication session with the second device is not established in a case where it is determined that the model name of the second device is identical to the model name of the particular device,
wherein the computer-readable instructions, when executed by the processor of the communication device, further cause the communication device to perform:
in a case where it is determined that the model name of the first device is identical to the model name of the particular device after the registering operation has been accepted, sending the obtained plurality of setting values to the first device in accordance with a second communication protocol in conformity to SNMP (an abbreviation of Simple Network Management Protocol) without accepting a further operation from the user and without establishing the communication session with the first device; and
in a case where it is determined that the model name of the second device is identical to the model name of the particular device after the registering operation has been accepted, sending the obtained plurality of setting values to the second device in accordance with the second communication protocol without accepting a further operation from the user and without establishing the communication session with the second device.

6. The non-transitory computer-readable storage medium as in claim 1, wherein
the computer-readable instructions, when executed by the processor of the communication device, further cause the communication device to perform:
sending the plurality of setting values to the first device in accordance with a second communication protocol in conformity to SNMP (an abbreviation of Simple Network Management Protocol) without accepting a further operation from the user after the registering operation has been accepted; and
sending the plurality of setting values to the second device in accordance with the second communication protocol without accepting a further operation from the user after the registering operation has been accepted,
wherein the communication session with the first device is established in a case where a notification is received from the first device after the plurality of setting values has been sent to the first device in accordance with the second communication protocol, the notification indicating that it is impossible to register at least one setting value among the plurality of setting values,
the communication session with the first device is not established in a case where the notification is not received from the first device after the plurality of setting values has been sent to the first device in accordance with the second communication protocol,
the communication session with the second device is established in a case where the notification is received from the second device after the plurality of setting values has been sent to the second device in accordance with the second communication protocol, and
the communication session with the second device is not established in a case where the notification is not received from the second device after the plurality of setting values has been sent to the second device in accordance with the second communication protocol.

7. The non-transitory computer-readable storage medium as in claim 6, wherein
the sending of the plurality of setting values to the first device and the sending of the plurality of setting values to the second device are performed by broadcast-transmitting the plurality of setting values in accordance with the second communication protocol.

8. The non-transitory computer-readable storage medium as in claim 1, wherein
the computer-readable instructions, when executed by the processor of the communication device, further cause the communication device to perform:
accepting a search operation performed by the user for searching a device existing around the communication device before the registering operation is accepted;
broadcast-transmitting a device search signal in accordance with a second communication protocol in conformity to SNMP (an abbreviation of Simple Network Management Protocol) in a case where the search operation is accepted;
receiving, from each of N pieces of devices, a device name of the device after the device search signal has been sent, the N being an integer equal to or more than the M; and
causing a display unit of the communication device to display N pieces of device names received from the N pieces of devices, in order to cause the user to select the M pieces of devices from among the N pieces of devices.

9. The non-transitory computer-readable storage medium as in claim 1, wherein
the plurality of setting values includes at least one of:
an address setting value indicating an address for executing a communication;
a scan setting value indicating a scan setting for executing a scan of a document; and
a date-and-time setting value indicating a current date and a current time.

10. The non-transitory computer-readable storage medium as in claim 1, wherein
the communication session with the first device is established in accordance with TCP (an abbreviation of Transmission Control Protocol), and
the communication session with the second device is established in accordance with TCP.

11. A non-transitory computer-readable storage medium storing computer-readable instructions for a communication device,
wherein the computer-readable instructions, when executed by a processor of the communication device, cause the communication device to perform:
obtaining a plurality of setting values related to a plurality of setting items from a memory of a particular device in which the plurality of setting values is currently registered;
accepting a registering operation performed by a user for registering the plurality of setting values in a target device different from the communication device;
establishing a communication session with the target device in a case where the registering operation is accepted and the target device has a model name which is not identical to a model name of the particular device;
sending the obtained plurality of setting values to the target device by using the communication session with the target device in accordance with a first communication protocol in conformity to HTTP (an abbreviation of Hypertext Transfer Protocol);
disconnecting the communication session with the target device after the plurality of setting values has been sent to the target device; and
sending the obtained plurality of setting values to the target device in accordance with a second communication protocol in conformity to SNMP (an abbreviation of Simple Network Management Protocol) without establishing the communication session, in a case where the registering operation is accepted and the target device has the model name which is identical to the model name of the particular device.

12. The non-transitory computer-readable storage medium as in claim 11, wherein
the computer-readable instructions, when executed by the processor of the communication device, further cause the communication device to perform:
receiving a model name of the target device from the target device;
obtaining a model name of the particular device from the memory of the particular device; and
determining whether the model name of the target device is identical to the model name of the particular device,
wherein the communication session with the target device is established in a case where the registering operation is accepted and it is determined that the model name of the target device is not identical to the model name of the particular device,
the communication session with the target device is not established in a case where the registering operation is accepted and it is determined that the model name of the target device is identical to the model name of the particular device, and
the sending of the obtained plurality of setting values in accordance with the second communication protocol is not performed in a case where it is determined that the model name of the target device is not identical to the model name of the particular device.

13. The non-transitory computer-readable storage medium as in claim 11, wherein
in a case where the registering operation is accepted, the sending of the obtained plurality of setting values in accordance with the second communication protocol is performed, regardless of whether the target device has a model name which is identical to the model name of the particular device,
the communication session with the target device is established in a case where a notification is received from the target device due to the target device having a model name which is not identical to the model name of the particular device after the plurality of setting values has been sent to the target device in accordance with the second communication protocol, the notification indicating that it is impossible to register at least one setting value among the plurality of setting values, and
the communication session with the target device is not established in a case where the notification is not received from the target device due to the target device having the model name which is identical to the model name of the particular device after the plurality of setting values has been sent to the target device in accordance with the second communication protocol.

14. A setting device comprising:
a processor; and
a memory configured to store a plurality of first setting values related to a plurality of setting items,
wherein the memory is further configured to store computer-readable instructions therein, the computer-readable instructions, when executed by the processor, causing the setting device to perform:
establishing a communication session with a communication device;
receiving a plurality of second setting values related to the plurality of setting items from the communication device by using the communication session in accordance with a first communication protocol in conformity to HTTP (an abbreviation of Hypertext Transfer Protocol);
in response to receiving the plurality of the second setting values, registering a part of the plurality of the second setting values related to a part of the plurality of setting items in place of a part of the plurality of the first setting values within the memory, the part of the plurality of setting items being predetermined registrable setting items in the setting device;
wherein in response to receiving the plurality of the second setting values, a remaining part of the plurality of the second setting values related to a remaining part of the plurality of setting items is not registered in place of a remaining part of the plurality of the first setting values within the memory, the remaining part of the plurality of setting items being predetermined unregistrable setting items in the setting device, the remaining part of the plurality of setting items being predetermined registrable setting items in another device having a model name which is different from a model name of the setting device.

\* \* \* \* \*